United States Patent [19]

Ludwig

[11] Patent Number: 5,571,222

[45] Date of Patent: Nov. 5, 1996

[54] PROCESS AND ARRANGEMENT FOR MEASURING TAPERED THREAD

[75] Inventor: Peter Ludwig, Kappeln, Germany

[73] Assignee: Carl Zeiss Jena GmbH, Jena, Germany

[21] Appl. No.: 410,249

[22] Filed: Mar. 24, 1995

[30] Foreign Application Priority Data

Mar. 24, 1994 [DE] Germany ................ 44 10 195.3

[51] Int. Cl.$^6$ ................................................ G01B 5/008
[52] U.S. Cl. ..................... 33/199 B; 33/503; 73/162
[58] Field of Search .................. 33/199 B, 501.7, 33/501.8, 501.9, 501.11, 501.12, 501.14, 501.15, 501.16, 501.17, 501.18, 199 R, 502, 503, 504, 531, 532, 536, 537, 567, 567.1, 568, 573; 73/162

[56] References Cited

U.S. PATENT DOCUMENTS

| | | | |
|---|---|---|---|
| 2,321,903 | 6/1943 | Fox | 33/199 B |
| 4,080,741 | 3/1978 | Siddall et al. | 33/503 |
| 4,389,785 | 6/1983 | Goldsmith et al. | 33/536 |
| 4,986,003 | 1/1991 | DoCarmo | 33/502 |
| 5,207,097 | 5/1993 | Gutman | 73/162 |
| 5,396,712 | 3/1995 | Herzog | 33/502 |

FOREIGN PATENT DOCUMENTS

| | | | |
|---|---|---|---|
| 3119629A1 | 12/1982 | Germany . | |
| 3200695 | 7/1983 | Germany | 33/199 B |
| 3711455A1 | 1/1988 | Germany . | |
| 87114909 | 1/1988 | Germany . | |

OTHER PUBLICATIONS

H. Zill, "Messen und Lehren", B. G. Teubner Verlagsgesellschaft, Leipzig, 1956, pp. 183–184 (No Month).

W. Langsdorff, "Messen von Gewinden" Springs–Verlag, Berlin, 1974, pp. 69–74 (No Month).

"Witworth–Rohrgewinde für Gerwinderohre und Fittings", Jul. 1983.

"Metrisches kegeliges Auss engewinde", Apr. 1971.

*Primary Examiner*—Christopher W. Fulton
*Attorney, Agent, or Firm*—McAulay Fisher Nissen Goldberg & Kiel, LLP

[57] ABSTRACT

A process for measuring characteristic values and fundamental quantities of tapered thread using the one-ball or two-ball measuring method is disclosed. The process is used, in particular, on coordinate measurement devices with a device table which is movable in at least two coordinate axes and with a measurable relative movement between the device table and a measuring feeler. After calibrating the measuring feeler by means of a calibrating ring, the test piece is clamped on a table which is adjusted in such a way that a first flank diameter line 11 of the tapered thread is aligned vertically to the surface of the device table. The thread of the test piece is then sensed in a plurality of Z coordinates. The measurement data recorded in so doing are fed to an evaluating device. In an additional process step, the table is adjusted in such a way that a second flank diameter line located diametrically opposite the first flank diameter line extends vertically to the surface of the device table and the thread is contacted. The measurement data determined in this way are also fed to the evaluating device and stored therein. The characteristic values and fundamental quantities to be determined are calculated from the sum of measurement data collected.

13 Claims, 2 Drawing Sheets

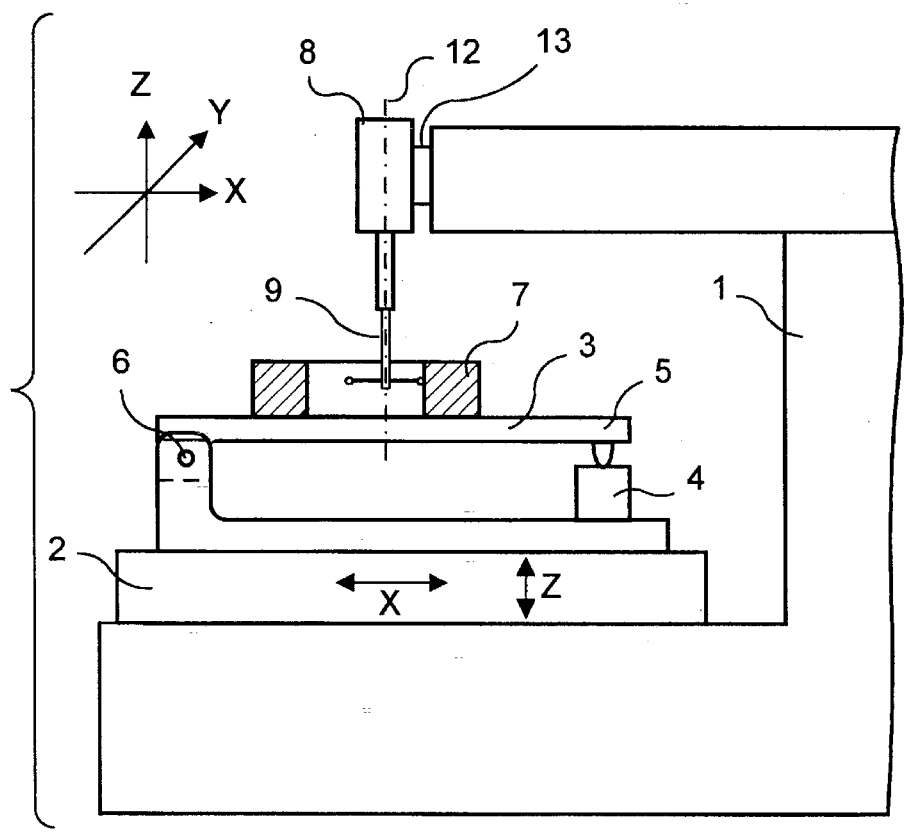
F I G. 1
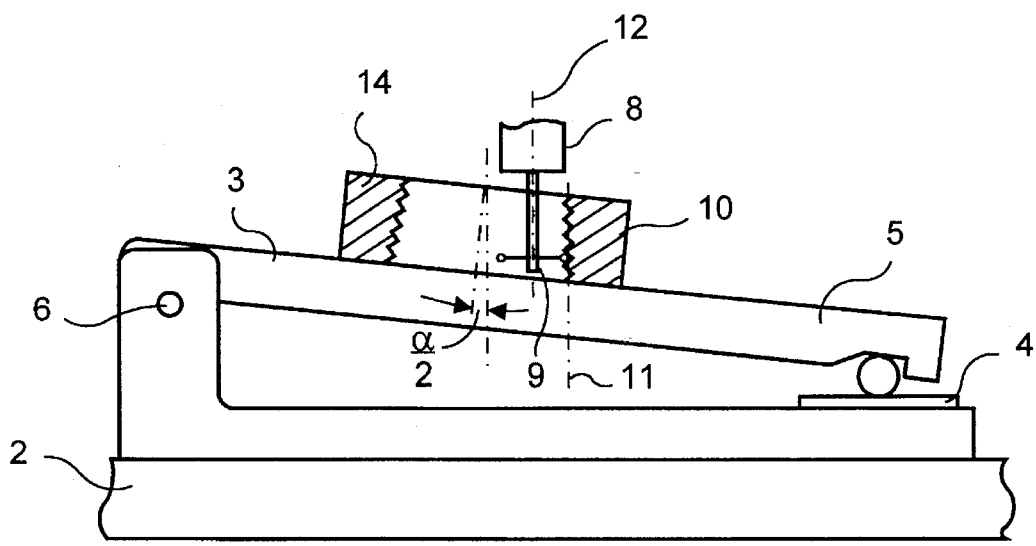
F I G. 2

PROCESS AND ARRANGEMENT FOR MEASURING TAPERED THREAD

BACKGROUND OF THE INVENTION a) Field of the Invention

The invention is directed to a process and an arrangement for measuring tapered internal thread, in particular on coordinate measurement devices using a one-ball or two-ball measuring method.

b) Description of the Related Art

It is suitable for the measurement of tapered internal and external threads. Two-ball measuring methods and arrangements for carrying out these methods which are applied in combination with a single-coordinate measurement device are known. For this purpose, two measuring clips with measuring balls are arranged at measuring spindles of the measuring device and brought into contact in opposite thread turns of an internal thread, the test piece being held on a floating measurement table of the measuring device. However, such methods have so far been applied only to cylindrical internal threads (DE-GM 87 11 490). Further, it is known from this reference to provide a single-angled or double-angled measuring clip to the measuring spindle for feeling the test piece, this measurement clip having two arms, each of which is provided with a measuring ball. The measuring balls are fastened at the arms opposite one another in the measuring direction and preferably have a defined spacing from one another. These measuring balls are brought into contact with opposite thread flanks.

The flank diameter of a tapered thread is defined in a testing plane (normal to the cone axis) which has a determined spacing from the end face of the thread (DIN 158; DIN 2999).

The ratios in cylindrical internal threads cannot readily be transferred to the measurement of tapered internal threads. Thus, in manufacturing, this is restricted as far as possible to summary testing of fundamental quantities by means of gauges. However, with gauges, which also include thread rings with tapered internal thread, the individual fundamental quantities of the respective thread must be determined. These measurements pose acute measuring problems. The three-wire method is often used for measuring tapered external threads (W. Langsdorff, "Messen von Gewinden [Measurement of Threads]", Springer Verlag, Berlin, Heidelberg, New York 1974, pages 69 to 74, and H. Zill, "Messen und Lehren im Maschinen-und Feingerätebau [Measurement and Gauges in Machine Building and Precision Instrument Building]", B. G. Teubner Verlagsgesellschaft, Leipzig 1956, pages 183 and 184).

As concerns the construction of the gauges, however, the user must decide what quantities or defining pieces are to be measured on the test pieces. If all fundamental quantities of the thread must be tested with respect to their combined action, tapered thread ring gauges or plug gauges must be used. But these ring gauges or plug gauges must themselves be measured with the necessary accuracy and the dimensional accuracy of such thread gauges must be tested after a certain period of use, which up to this point has been very involved and costly or simply inaccurate. For example, a ring gauge with a cylindrical thread was screwed into a tapered internal thread and the value of the flank diameter was derived from the screw-in depth. However, knowledge of the flank diameter and/or deviations from the angle of taper is essential for assessing a thread gauge.

OBJECT AND SUMMARY OF THE INVENTION

Therefore, the primary object of the present invention is to provide a process and an arrangement for measuring tapered thread by which fundamental quantities of such thread can be effectively measured on coordinate measurement devices for the first time in a simple manner and with the required accuracy.

According to the invention, this object is met in a process for measuring tapered threads by the one-ball or two-ball measuring method, in particular, on coordinate measurement devices outfitted with a table and a measuring feeler which are movable relative to one another, wherein a feeler element which can be deflected in a measurement coordinate is arranged at the measuring feeler and is brought into contact with different thread flanks of the thread of the test piece to be tested one after the other and wherein the measurement data determined by contacting the thread flanks of the test piece are fed to an evaluating device for determining the characteristic values and fundamental quantities of the measured thread. The improvement comprises the steps of calibrating the measuring feeler of the coordinate measurement device by diametrically contacting a calibrating ring placed on a horizontally adjusted table arranged on the device table of the coordinate measurement device and storing the recorded measurement data in the evaluating device, positioning a test piece on the table and adjusting the table so that a first flank diameter line of the tapered thread is aligned vertically to the surface of the device table (X-Y plane) and contacting the thread in at least one thread turn and performing on-line recording of measurement data and storage of same in the evaluating device, adjusting the table so that a second flank diameter line of the tapered thread located diametrically opposite the first flank diameter line is aligned vertically to the surface of the device table (X-Y plane) and contacting the thread in at least one thread turn and performing on-line recording of the measurement data and storage of same in the evaluating device, and calculating and determining the characteristic values and fundamental quantities of the tapered thread by the evaluating device.

Also in accordance with the invention, an arrangement for carrying out a process for measuring tapered thread comprises a coordinate measurement device which includes a device table which can be moved along at least two coordinate axes (X and Z axes). Also included is a measuring feeler having a feeler element which is arranged at the coordinate measurement device, can be aligned in a Z axis and which can be deflected along the X axis. A further table is included which is arranged on the device table, can be adjusted angularly and holds a test piece. Finally, an evaluating device is electrically connected with the measuring feeler. The arrangement allows, according to the process, that the measurement feeler is first calibrated, a test piece is positioned on the further table and the table is adjusted to allow a first flank and second flank diameter line of the test piece to be successively aligned with the further table and the thread contacted and on-line recording made by the evaluating device which also calculates and determines the characteristic values and fundamental quantities of the tapered thread.

The process according to the invention makes it possible to carry out highly precise measurements on tapered internal and external threads in a simple and economical manner on existing coordinate measurement devices without complicated auxiliary equipment. Accordingly, it is possible to measure characteristic values and fundamental quantities of tapered thread which could previously only be roughly determined, if at all, by gauges. A simple, measurably adjustable table is provided which is arranged on the device table of the coordinate measurement device and can be adjusted angularly with reference to the plane of the device table (X-Y plane) by tilting along the Y axis, where the X axis runs perpendicular to the Y axis. The test piece is clamped on this table and can be adjusted in a simple manner by adjusting the table in such a way that the feeler can be used to sense the thread flanks, also in different Z coordinates. In so doing, the table is advantageously constructed as a sine-bar table or sine table. The angular adjustment of the sine table can be effected by means of gauge blocks arranged under the free end of the sine table. By raising or lowering the sine table, the test piece is so adjusted that the respective flank diameter line of the tapered internal and external thread to be tested, along which the thread is contacted by the feeler, extends parallel to the Z axis of the coordinate measurement device and accordingly vertically to the X-Y plane determined by the device table of the device.

The calibration of the feeler used for measuring, which must be carried out prior to the actual measurement, is effected in a simple manner, as is known per se, by means of a calibrating ring which is clamped on the horizontally adjusted sine table, in that the calibrating ring is contacted at diametrically opposite locations accompanied by determination of reversal points and the determined sensed values are evaluated for determining the feeler parameters to be taken into account in the subsequent measurements. After calibrating, the calibrating ring is removed and the test piece is arranged on the table in its place. By adjusting the table, which is constructed as a sine table, in such a way that a first flank diameter line of the test piece is aligned vertically to the X-Y plane and by contacting the thread in at least one thread turn, measurement data are recorded on-line, fed to an evaluating device and stored therein.

In another process step, the sine table is then adjusted in such a way that a second flank diameter line located diametrically opposite the first flank diameter line is adjusted vertically to the X-Y plane. With this adjustment, the thread to be tested is now contacted in at least one thread turn and the measurement data which are recorded on-line are likewise fed to the evaluating device.

With the aid of the measurement values determined in this way, the characteristic values and fundamental quantities of the tapered thread to be measured are calculated by means of appropriate software. For example, a fundamental quantity of this type can be the flank diameter.

For instance, the angle of taper or error in this angle of taper, can be determined or angle errors of the table can be eliminated according to this process. In such cases, the thread of the test piece is contacted in at least two thread turns along at least one flank diameter line and the determined measurement data are also recorded on-line and fed to the evaluating device.

For the purpose of measuring by means of the process according to the invention, a feeler lever with a T-shaped feeler element aligned parallel to the X axis of the measuring device is advantageously used. The ball diameter is advantageously selected in such a way that the points of contact of the ball with the internal thread lie in the vicinity of the flank diameter in two-flank systems. The measured values are then fed on-line to the evaluating device for every feeler measurement after determining the reversal points.

An arrangement for carrying out the process for measuring tapered external and internal thread on a coordinate measurement device has a device table which is movable along at least two coordinate axes (Y; Z). A table, preferably a sine table, is arranged on the device table and is adjustable angularly with respect to the device table and holds the test piece. Further, a measurement feeler which can be adjusted and aligned in the direction of the Z axis and has a feeler element which can be deflected in the direction of the X axis is provided on the coordinate measurement device. The swivel axis of the sine table advantageously extends parallel to the Y-axis. There must be a measurable relative movement between the table and measuring feeler in the X direction.

The invention will be explained more fully in the following with reference to an embodiment example shown in the drawing.

BRIEF DESCRIPTION OF THE DRAWINGS

In the drawings:

FIG. 1 shows an arrangement for measuring tapered internal thread with attached calibrating ring; and FIGS. 2 and 3 show the sine table with test piece placed thereon in different angular positions.

Figure 3:
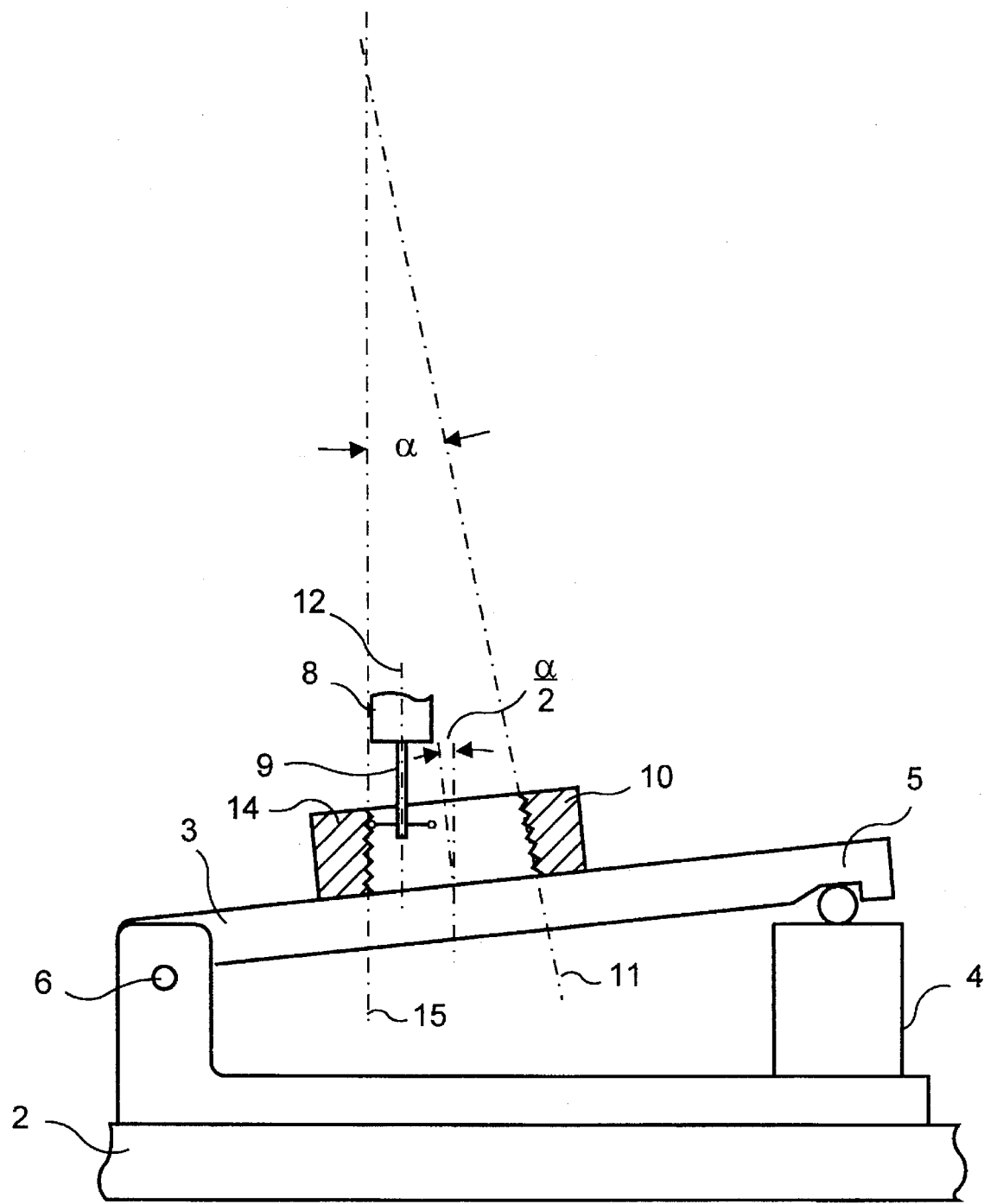

The invention will be explained in more detail by way of the example of measuring tapered internal thread, wherein the ratios can also be transferred to the measurement of external threads and right cones.

FIG. 1 shows a highly simplified view of a coordinate measurement device (CMD) 1 which is suitable for measuring tapered internal threads using the process according to the invention. A table 3, preferably a sine table, which can be displaced in a measurable manner is provided on a device table 2 of the CMD 1 and is adjustable angularly with respect to the device table 2 around a swivel pin 6 which is aligned with respect to the Y coordinate and disposed vertically to the X-Z plane, this device table 2 being advantageously movable along at least two coordinate axes X and Z (as indicated by arrows). The adjustment of the table 3 is effected as is known per se by placing gauge blocks 4 under the free end 5 of the table 3 which is constructed as a sine table, this free end 5 being located opposite the swivel pin 6. Further, as will be seen from FIG. 1, the sine table is adjusted horizontally and a calibrating ring 7 is located on this table for calibrating the measuring feeler 8 and its feeler element 9 arranged on the CMD 1. The feeler element 9 can be deflected in the direction of the X coordinate or X axis. The measuring feeler 8 is advantageously supported in a spring parallelogram 13 at the CMD 1 to enable its alignment along the Z axis. The diameter of the balls of the feeler element 9 is preferably so dimensioned that the points of contact between the balls and the internal thread of the test piece 10 to be contacted lie in or in the vicinity of the flank diameter of the thread (FIGS. 2 and 3). The measuring feeler 8 is electrically connected with an evaluating device (not shown in the drawings).

The calibration of the measuring feeler 8 with horizontally adjusted sine table is effected as is known per se in that one side of the calibrating ring 7 is first contacted by the feeler element 9. The table is then displaced in the X direction until the feeler element 9 contacts the diametrically opposite side of the calibrating ring 7. For example, if the feeler element 9 is provided at a displaceable measuring spindle of a measuring device (not shown in the drawings), this measuring spindle is displaced in the X direction while the table remains stationary. The measurement data recorded in so doing are fed to the evaluating device and stored for later reuse.

After this calibrating process, the test piece 10 is positioned and fixed on the table 3 in place of the calibrating ring 7 and the table 3 is tilted by placing gauge blocks 4 underneath it in a combination such that a first flank diameter line 11 of the tapered internal thread 14 to be tested is aligned vertically to the surface of the device table 2 (FIG. 2). The tilting angle relative to the horizontal position of the table 3 corresponds to half the angle of taper α of the tapered internal thread 14. Measured values are recorded by feeling the internal thread 14 in a first thread turn and then in a second thread turn lying in a different Z coordinate and are then fed to and stored in the evaluating device (not shown).

As will be seen from FIG. 3, the table 3 is then tilted upward by placing underneath it another combination of gauge blocks 4 until a second flank diameter line 15 of the tapered internal thread 14 located diametrically opposite the first flank diameter line 11 extends vertically to the surface of the device table 2 and accordingly also parallel to the axis 12 of the measuring feeler. By contacting the internal thread 14 in a first thread turn and then in a second thread turn lying in a different Z coordinate, the measured values are recorded, fed to the evaluating device and stored therein.

In the following process step, the characteristic values or fundamental quantities of the tapered internal thread 14 to be determined, e.g., the flank diameter and/or deviations from the angle of taper α, and the internal diameter, external diameter and plausibility of the partial flank angle are calculated by means of the evaluating device or by means of a computer with the aid of suitable software and are then outputted as appropriate.

In the embodiment example according to FIGS. 1 to 3, the process and the device were described by using the example of a multiple-coordinate measurement device. However, the process according to the invention can also be carried out with a single-coordinate measurement device which is outfitted with a vertically adjustable device table and with at least one measuring spindle at which the feeler element is arranged. The sine table is arranged on this device table and the test piece is fastened to the table for measurement. The tapered thread of the test piece is sensed by the feeler element in the manner described above. The processing of the recorded measurement data in the evaluating device can be effected in the manner described above.

The process and arrangement are not limited only to measurement of tapered internal and external thread. Smooth inner and outer cones can also be tested and measured in a simple manner as was already indicated above.

What is claimed is:

1. In a process for measuring a tapered thread of a test piece by the one-ball or two-ball measuring method, in particular, on a coordinate measurement device outfitted with a device table and a measuring feeler which are movable relative to one another, wherein a feeler element which can be deflected in a measurement coordinate is arranged at the measuring feeler and is brought into contact with different thread flanks of the thread of the test piece to be tested one after the other, and wherein the measurement data determined by contacting the thread flanks of the test piece are fed to an evaluating device for determining the characteristic values and fundamental quantities of the measured thread, the improvement comprising the process steps of:

calibrating the measuring feeler of the coordinate measurement device by diametrically contacting a calibrating ring placed on a horizontally adjusted auxiliary table arranged on the device table of the coordinate measurement device and storing the recorded measurement data in the evaluating device;

positioning the test piece on said auxiliary table and adjusting said auxiliary table so that a first flank diameter line of the tapered thread is aligned vertically to a surface of the device table and contacting the thread in at least one thread turn and performing on-line recording of measurement data and storage of same in the evaluating device;

adjusting said auxiliary table so that a second flank diameter line of the tapered thread located diametrically opposite the first flank diameter line is aligned vertically to the surface of the device table (X-Y plane) and contacting the thread in at least one thread turn and performing on-line recording of the measurement data and storage of same in the evaluating device; and calculating and determining the characteristic values and fundamental quantities of the tapered thread by said evaluating device.

2. The process according to claim 1, including the step of contacting the thread of the test piece in two thread turns along at least one flank diameter line in order to determine the angle of taper and to eliminate the angular error of the table.

3. An arrangement for carrying out a process for measuring a tapered thread of a test piece by the one-ball or two-ball measuring method, comprising:

a coordinate measurement device;

said device including:

a device table which can be moved along at least two coordinate axes;

a measuring feeler having a feeler element which is arranged at said coordinate measurement device, can be aligned in a Z axis and which can be deflected along an X axis;

an auxiliary table which is arranged on said device table, can be adjusted angularly about a swivel axis extending parallel to said device table and holds the test piece; and an evaluating device which is electrically connected with said measuring feeler, wherein, according to the process, the measurement feeler is first calibrated, the test piece is positioned on said auxiliary table and said auxiliary table is adjusted to allow a first flank and a second flank diameter line of the test piece to be successively aligned perpendicularly to said device table and the thread contacted and on-line recording made by the evaluating device which also calculates and determines the characteristic values and fundamental quantities of the tapered thread.

4. The arrangement according to claim 3, wherein said auxiliary table is a measurably displaceable table and said swivel axis extends parallel to a Y axis.

5. The arrangement according to claim 3, wherein the measuring feeler arranged at the coordinate measurement device is adjustable in the direction of said Z axis extending vertically to an X-Y plane and wherein said feeler element can be deflected in the X axis extending vertically to a Y axis.

6. The arrangement according to claim 3, wherein said further table is constructed as a sine table.

7. The arrangement of claim 3, wherein said feeler element is T-shaped.

8. A coordinate measurement apparatus for use in measuring tapered thread, comprising:

a first table linearly shiftable along at least an X axis and a Y axis of a three coordinate axis system;

a measuring feeler having a feeler element alignable along a Z axis of the coordinate axis system and deflectable along said X axis;

a second table disposed on said first table for holding a test piece having a tapered thread, said second table extending at an adjustable angle about a swivel axis oriented parallel to said Y axis; and evaluating means electrically coupled to said measuring feeler for calculating and determining characteristic values and fundamental quantities of said tapered thread upon a contacting of said tapered thread by said measuring feeler in a first disposition of said test piece on said second table so that a first flank diameter line of said test piece extends perpendicularly to said first table and upon another contacting of said tapered thread in a second disposition of said test piece on said second table so that a second flank diameter line of said test piece extends perpendicularly to said first table.

9. The coordinate measurement apparatus according to claim 8 wherein said Z axis extends perpendicularly to a plane defined by said X axis and said Y axis, said X axis extending perpendicularly to said Y axis, said measuring feeler being adjustable in position along said Z axis, said feeler element being deflectable along said X axis.

10. The coordinate measurement apparatus according to claim 8 wherein said second table is a sine table.

11. The coordinate measurement apparatus according to claim 8 wherein said feeler element is T-shaped.

12. A process for measuring tapered threads, comprising:

providing a coordinate measuring apparatus including a first table and a measuring feeler which are movable relative to one another, a second table being disposed on said first table, said measuring feeler having a feeler element which can be deflected along a measurement axis;

placing a calibrating ring on said second table, said second table being oriented substantially horizontally;

calibrating the measuring feeler of the coordinate measuring apparatus by contacting diametrically opposed surfaces of said calibrating ring while said calibrating ring is disposed on the horizontally oriented second table, the calibrating of the measuring feeler including generating measurement data;

storing the measurement data in an evaluating device;

positioning, on said second table, a test piece having a tapered thread with a first flank diameter line and a second flank diameter line disposed diametrically across said test piece from one another;

adjusting said second table relative to said first table so that said first flank diameter line is oriented perpendicularly with respect to said first table;

while said first flank diameter line is oriented perpendicularly with respect to said first table, contacting said tapered thread in at least one thread turn with said feeler element and performing on-line recording of measurement data and storage thereof in said evaluating device;

adjusting said second table relative to said first table so that said second flank diameter line is oriented perpendicularly with respect to said first table;

while said second flank diameter line is oriented perpendicularly with respect to said first table, contacting said tapered thread in at least one thread turn with said feeler element and performing on-line recording of measurement data and storage thereof in said evaluating device; and subsequently operating said evaluating device to calculate and determine characteristic values and fundamental quantities of said tapered thread.

13. The process according to claim 12, further comprising the step of contacting said tapered thread in an least two thread turns along at least one of said first flank diameter line and said second flank diameter line.

\* \* \* \* \*